United States Patent
Maeda et al.

(10) Patent No.: US 11,370,251 B2
(45) Date of Patent: Jun. 28, 2022

(54) TIRE

(71) Applicant: Sumitomo Rubber Industries, Ltd., Kobe (JP)

(72) Inventors: Yoshiyuki Maeda, Kobe (JP); Keita Nakano, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 491 days.

(21) Appl. No.: 15/883,438

(22) Filed: Jan. 30, 2018

(65) Prior Publication Data
US 2018/0215205 A1 Aug. 2, 2018

(30) Foreign Application Priority Data
Jan. 31, 2017 (JP) .............................. JP2017-015904

(51) Int. Cl.
| | |
|---|---|
| *B60C 11/03* | (2006.01) |
| *B60C 11/13* | (2006.01) |
| *B60C 11/04* | (2006.01) |
| *B60C 11/12* | (2006.01) |

(52) U.S. Cl.
CPC .......... *B60C 11/0306* (2013.01); *B60C 11/03* (2013.01); *B60C 11/0302* (2013.01); *B60C 11/032* (2013.01); *B60C 11/0304* (2013.01); *B60C 11/04* (2013.01); *B60C 11/13* (2013.01); *B60C 11/1307* (2013.01); *B60C 2011/039* (2013.01); *B60C 2011/0353* (2013.01); *B60C 2011/0374* (2013.01);
(Continued)

(58) Field of Classification Search
CPC . B60C 11/03; B60C 11/04; B60C 2011/0339; B60C 2011/0341
See application file for complete search history.

(56) References Cited

U.S. PATENT DOCUMENTS 2,575,439 A * 11/1951 Billingsley ......... B60C 11/0323
152/209.17
6,991,015 B2 * 1/2006 Kuroda .................... B60C 3/06
152/209.16
(Continued)

FOREIGN PATENT DOCUMENTS

EP 3112186 B1 * 1/2019 ......... B60C 11/0304
EP 3231638 B9 * 10/2020 ......... B60C 11/0304
(Continued)

*Primary Examiner* — Cedrick S Williams
(74) *Attorney, Agent, or Firm* — Birch, Stewart, Kolasch & Birch, LLP

(57) ABSTRACT

A tire 1 comprises a tread portion 2 whose position when mounted on a vehicle is specified. The tread portion 2 comprises an outer tread edge (To), an inner tread edge (Ti), a plurality of main grooves 10, and a plurality of land regions 15. The main grooves 10 include a first main groove 11 whose groove edges are both positioned on an inner-tread-edge-(Ti) side of a tire equator (C), a second main groove 12 arranged on an inner-tread-edge-(Ti) side of the first main groove 11, and a third main groove 13 arranged between the tire equator (C) and the outer tread edge (To) and having a groove width smaller than the first and second main grooves 11 and 12. The land regions 15 include an inner middle land region 16 and an outer middle land region 17 having an axial width larger than the inner middle land region 16.

18 Claims, 6 Drawing Sheets

(52) U.S. Cl.
CPC ......... *B60C 2011/0383* (2013.01); *B60C 2011/0386* (2013.01); *B60C 2011/1213* (2013.01)

(56) References Cited

U.S. PATENT DOCUMENTS

| | | | | |
|---|---|---|---|---|
| 2005/0247388 | A1* | 11/2005 | Ohsawa | B60C 11/032 152/209.9 |
| 2006/0005904 | A1* | 1/2006 | Helt | B60C 11/0306 152/154.2 |
| 2010/0084063 | A1* | 4/2010 | Koutoku | B60C 11/01 152/209.22 |
| 2010/0108214 | A1* | 5/2010 | Colombo | B60C 11/0304 152/209.9 |
| 2010/0116388 | A1* | 5/2010 | Roder | B60C 1/0016 152/154.2 |
| 2013/0112325 | A1* | 5/2013 | Mukai | B60C 11/0304 152/209.8 |

FOREIGN PATENT DOCUMENTS

| | | | | |
|---|---|---|---|---|
| JP | 58177703 A | * | 10/1983 | B60C 11/042 |
| JP | 619315 | * | 1/1986 | B60C 11/06 |
| JP | 3365734 B2 | * | 1/2003 | B60C 11/0304 |
| JP | 5498029 B2 | | 5/2014 | |

* cited by examiner

TIRE

TECHNICAL FIELD

The present invention relates to a tire, and in particular, to a tire capable of exerting excellent performance during running in severe condition on a circuit road or the like.

BACKGROUND ART

Japanese Patent No. 5498029 (Patent Literature 1) has disclosed a tire mainly used for running in severe condition on a circuit road or the like. This tire is provided with main grooves extending continuously in a tire circumferential direction only in an inner tread portion thereof located, when the tire is mounted on a vehicle, on an inner side of the vehicle. However, the tire disclosed in the Patent Literature 1 has a problem that satisfactory running performance can not be obtained in running on a wet circuit road. On the other hand, in the case where a main groove is provided in an outer tread portion of the tire disclosed in the Patent Literature 1 without considering the position and the groove width of the main groove, it is possible that dry grip performance and uneven wear resistance performance are deteriorated.

SUMMARY OF THE INVENTION

The present invention was made in view of the above, and a primary object thereof is to provide a tire capable of exerting excellent wet performance while maintaining the dry grip performance and the uneven wear resistance performance during running in severe condition on a circuit road and the like.

In one aspect of the present invention, a tire comprises a tread portion, whose position when mounted on a vehicle is specified, comprising an outer tread edge positioned on an outer side of the vehicle when mounted on the vehicle, an inner tread edge positioned on an inner side of the vehicle when mounted on the vehicle, a plurality of main grooves extending continuously in a tire circumferential direction, and a plurality of land regions divided by the main grooves, wherein the main grooves include a first main groove whose groove edges are both positioned on a side closer to the inner tread edge of a tire equator, a second main groove arranged between the first main groove and the inner tread edge, and a third main groove whose groove edges are both positioned between the tire equator and the outer tread edge and having a width smaller than those of the first main groove and the second main groove, and the land regions include an inner middle land region defined as a region between the first main groove and the second main groove, and an outer middle land region defined as a region between the first main groove and the third main groove and having a width in a tire axial direction larger than that of the inner middle land region.

In another aspect of the invention, it is preferred that a distance L1 in the tire axial direction between the tire equator and a center line of the first main groove is in a range of from 8% to 25% of an inner tread width (Wi) between the tire equator and the inner tread edge.

In another aspect of the invention, it is preferred that in a transverse cross-sectional view of the tire, each of the main grooves has a pair of groove walls extending straight and outwardly in a tire radial direction, an angle θ1 between the pair of the groove walls of the first main groove and an angle θ2 between the pair of the groove walls of the second main groove are in a range of from 45 to 75 degrees, and an angle θ3 between the pair of the groove walls of the third main groove is not more than the angle θ1 and the angle θ2.

In another aspect of the invention, it is preferred that the inner middle land region is configured as a plane rib having no grooves.

In another aspect of the invention, it is preferred that both of the groove edges of the third main groove extend continuously in the tire circumferential direction without being connected with other grooves.

In another aspect of the invention, it is preferred that the outer middle land region is provided with a plurality of outer middle lateral grooves extending from the first main groove toward the outer tread edge and terminating within the outer middle land region.

In another aspect of the invention, it is preferred that the land regions further include an inner shoulder land region defined as a region between the second main groove and the inner tread edge, and the inner shoulder land region is provided with a plurality of inner shoulder grooves whose both ends in the tire axial direction are not connected with the main grooves and the inner tread edge.

In another aspect of the invention, it is preferred that the inner shoulder grooves include first inner shoulder grooves and second inner shoulder grooves having depths smaller than those of the first inner shoulder grooves, and the first inner shoulder grooves and the second inner shoulder grooves are arranged alternately in the tire circumferential direction.

In another aspect of the invention, it is preferred that the land regions further include an outer shoulder land region defined as a region between the third main groove and the outer tread edge, and the outer shoulder land region is provided with a plurality of outer shoulder grooves whose both ends in the tire axial direction are not connected with the main grooves and the outer tread edge.

In another aspect of the invention, it is preferred that the outer shoulder grooves include first outer shoulder grooves and second outer shoulder grooves having depths smaller than those of the first outer shoulder grooves, and the first outer shoulder grooves and the second outer shoulder grooves are arranged alternately in the tire circumferential direction.

In another aspect of the invention, it is preferred that the land regions further include an inner shoulder land region defined as a region between the second main groove and the inner tread edge, the inner shoulder land region is provided with a plurality of inner shoulder grooves whose both ends in the tire axial direction are not connected with the main grooves and the inner tread edge, and each of the outer shoulder grooves has a length in the tire axial direction larger than that of each of the inner shoulder grooves.

DESCRIPTION OF THE PREFERRED EMBODIMENT

An embodiment of the present invention will now be described in conjunction with accompanying drawings.

Figure 1:
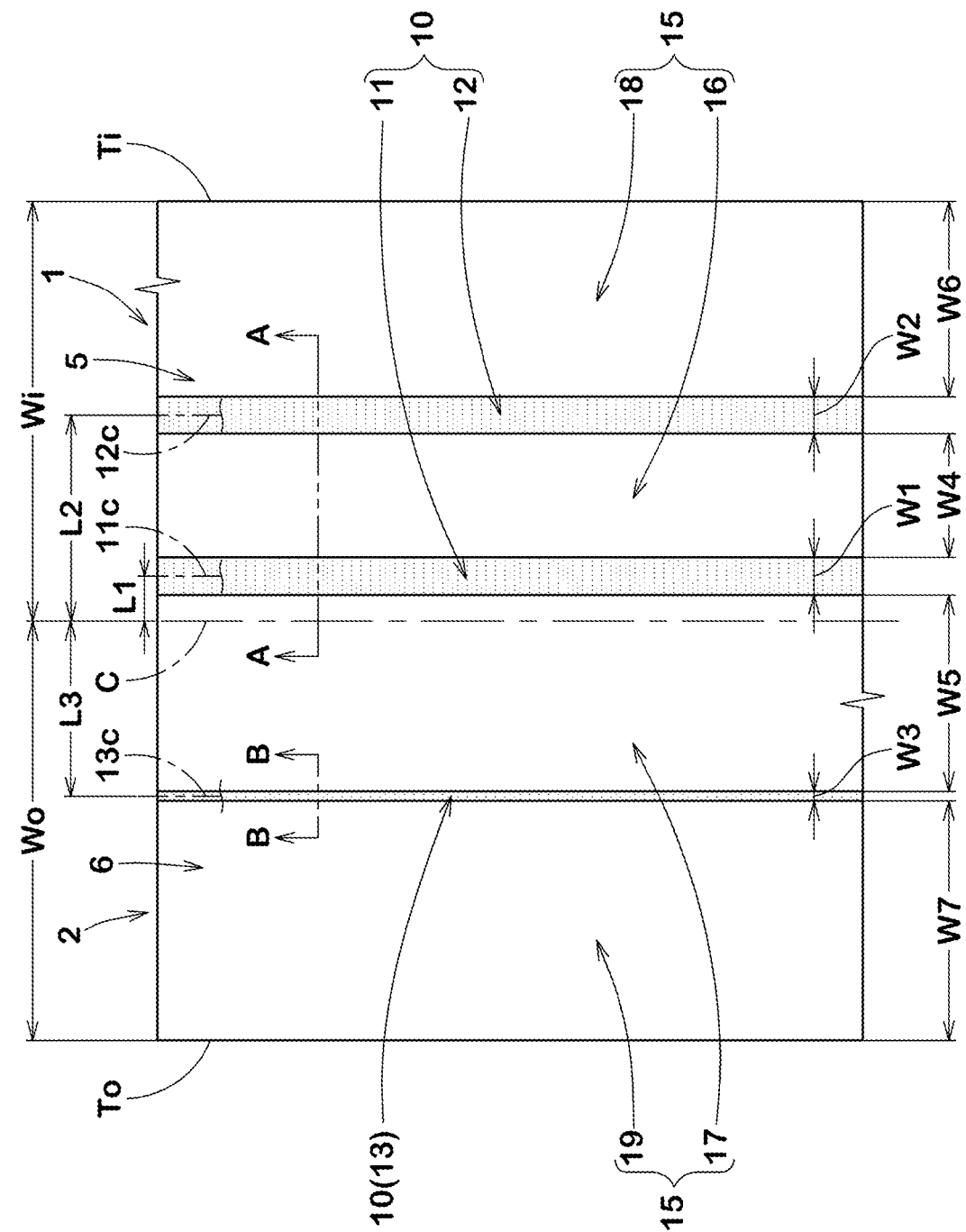
FIG. 1 is a development view of a tread portion of a tire according to an embodiment of the present invention.

FIG. 1 is a development view of a tread portion 2 of a tire 1 according to an embodiment of the present invention. The tire 1 in this embodiment is suitably used, for example, as a pneumatic tire for passenger cars, and particularly used as a high-performance tire for running on a circuit road or the like.

The tire 1 has the tread portion 2 whose position when mounted on a vehicle is specified. The mounting position on a vehicle is indicated by a letter or a mark on a sidewall portion (not shown) or the like, for example. In FIG. 1, when the tire 1 is mounted on a vehicle, right side of FIG. 1 corresponds to an inner side of the vehicle, and left side of FIG. 1 corresponds to an outer side of the vehicle.

By the mounting position on a vehicle being specified, the tread portion 2 is provided with an outer tread edge (To) positioned, when the tire 1 is mounted on a vehicle, on the outer side of the vehicle and an inner tread edge (Ti) positioned, when the tire 1 is mounted on a vehicle, on the inner side of the vehicle. Thereby, the tread portion 2 includes an inner tread portion 5 defined between a tire equator (C) and the inner tread edge (Ti), and an outer tread portion 6 defined between the tire equator (C) and the outer tread edge (To).

The tread edges (To) and (Ti) are defined as outermost ground contacting positions in a tire axial direction of the tire 1 when the tire 1 in a standard state is in contact with a flat surface with zero camber angle by being loaded with a standard tire load. The standard state is a state in which the tire 1 is mounted on a standard rim (not shown), inflated to a standard pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of main grooves 10 extending continuously in the tire circumferential direction and a plurality of land regions 15 divided by the main grooves 10.

The main grooves 10 include a first main groove 11, a second main groove 12, and a third main groove 13. Each of the main grooves 10 extends straight, for example, along the tire circumferential direction. The main grooves 10 are not limited to such a configuration, and they may be configured to extend in a wavy shape or a zigzag shape, for example.

The first main groove 11 is arranged so that both of groove edges thereof are positioned on a side closer to the inner tread edge (Ti) of the tire equator (C), i.e. on a side of the inner tread edge (Ti) of the tire equator (C). The second main groove 12 is provided between the first main groove 11 and the inner tread edge (Ti).

The first main groove 11 and the second main groove 12 effectively drain water between the tread portion 2 and a road surface during running on a wet circuit road, therefore, it is useful to exert excellent wet performance. On the other hand, since large ground contact pressure is likely to be applied to a part near the tire equator (C), if one of the main grooves 10 is provided on the tire equator (C), it is possible that uneven wear starting from groove edges of the main groove 10 occurs. In the tire 1 of the present invention, both of the groove edges of the first main groove 11 are arranged closer to the inner tread edge (Ti) than the tire equator (C), therefore, it is possible to exert excellent uneven wear resistance performance.

In order to further exert the above effect, the first main groove 11 is provided at a position away from the tire equator (C) by a distance L1, for example. The distance L1 in the tire axial direction between the tire equator (C) and a center line (11c) of the first main groove 11 is preferably not less than 5%, more preferably not less than 8%, still more preferably not less than 10% of an inner tread width (Wi), and preferably not more than 25%, more preferably not more than 20%, still more preferably not more than 15% of the inner tread width (Wi). Note that the inner tread width (Wi) is the distance in the tire axial direction between the tire equator (C) and the inner tread edge (Ti) of the tire 1 in the standard state.

From the same point of view, the second main groove 12 is provided at a position away from the tire equator (C) by a distance L2, for example. The distance L2 in the tire axial direction between the tire equator (C) and a center line (12c) of the second main groove 12 is preferably not less than 35%, more preferably not less than 40% of the inner tread width (Wi), and preferably not more than 65%, more preferably not more than 60% of the inner tread width (Wi).

In a case of a passenger car, a groove width W1 of the first main groove 11 and a groove width W2 of the second main groove 12 are preferably in a range of from 5.0 to 15.0 mm, more preferably in a range of from 8.0 to 12.0 mm, for example. Thereby, the dry grip performance and the wet performance are improved in a good balance.

Figure 2:
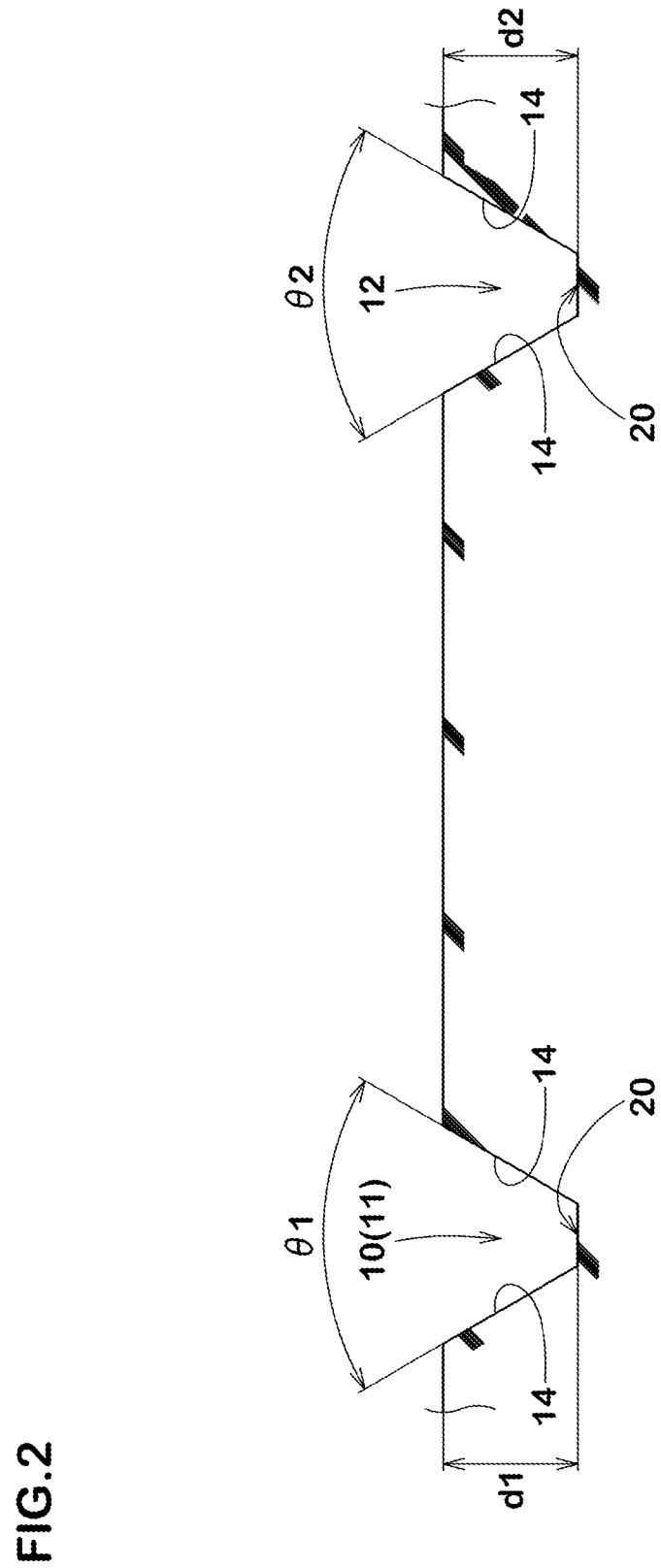
FIG. 2 is a cross-sectional view taken along A-A line of FIG. 1.

FIG. 2 is a cross-sectional view of the first main groove 11 and the second main groove 12 taken along A-A line of FIG. 1. As shown in FIG. 2, a groove depth (d1) of the first main groove 11 and a groove depth (d2) of the second main groove 12 are preferably in a range of from 4.0 to 7.0 mm, more preferably in a range of from 5.0 to 6.5 mm, for example.

In a transverse cross-sectional view of the tire, each of the first main groove 11 and the second main groove 12 has a pair of groove walls 14 extending from a groove bottom portion 20 straight and outwardly in a tire radial direction, for example. An angle θ1 between the pair of the groove walls 14 of the first main groove 11 and an angle θ2 between the pair of the groove walls 14 of the second main groove 12 are preferably not less than 45 degrees, more preferably not less than 55 degrees, and preferably not more than 75 degrees, more preferably not more than 65 degrees. The first main groove 11 and the second main groove 12 configured as such can suppress the uneven wear of the groove edges while exerting high drainage performance.

The first main groove 11 and the second main groove 12 in this embodiment are configured to have substantially the same dimensions. However, the main grooves 10 of the present invention are not limited to such an embodiment.

As shown in FIG. 1, the third main groove 13 is arranged so that both groove edges thereof are positioned between the tire equator (C) and the outer tread edge (To). Further, the third main groove 13 has a smaller groove width W3 than those of the first main groove 11 and the second main groove 12.

During running in severe condition on a circuit and the like, large ground contact pressure is likely to be applied to the outer tread portion 6 during cornering. In the present invention, the outer tread portion 6 is provided with the third main groove 13 having the smaller groove width than those of the first main groove 11 and the second main groove 12, therefore, it is possible that rigidity of the outer tread portion 6 is secured and eventually excellent dry grip performance is exerted. Further, large ground contact pressure is applied to the third main groove 13 during cornering, therefore, even though the third main groove 13 has the relatively small groove width, it is possible to exert sufficient drainage performance during running on a wet road surface.

The third main groove 13 is provided at a position away from the tire equator (C) by a distance L3, for example. The distance L3 in the tire axial direction between the tire equator (C) and a center line (13c) of the third main groove 13 is preferably not less than 30%, more preferably not less than 35% of an outer tread width (Wo), and preferably not more than 55%, more preferably not more than 50% of the outer tread width (Wo). Note that the outer tread width (Wo) is the distance in the tire axial direction between the tire equator (C) and the outer tread edge (To) of the tire 1 in the standard state.

The third main groove 13 configured as such is optimized in the position thereof, therefore, it is possible that the dry grip performance and the wet performance are improved in a good balance. Further, the outer tread portion 6 provided with the third main groove 13 is easy to generate heat due to repeated deformation during running, therefore, the temperature thereof is easy to rise to a proper temperature at a start of running, thereby, grip performance inherent in the tire is exerted at an early stage (hereinafter, such performance may be referred to as "warming performance"). Furthermore, in the outer tread portion 6 provided with the third main groove 13, rigidity thereof is moderated, therefore, it is easy for the driver to perceive a change in grip force when running at the limit, thereby, it is possible that control performance of the vehicle when running at the limit is improved.

In order to exert the above-mentioned effects in a good balance, it is preferred that the groove width W3 of the third main groove 13 is in a range of from 0.20 to 0.40 times the groove width W1 of the first main groove 11, for example. In the case of a tire for a passenger car, the groove width W3 of the third main groove 13 is preferably in a range of from 2.5 to 6.0 mm, more preferably in a range of from 3.0 to 4.0 mm, for example.

Figure 3:
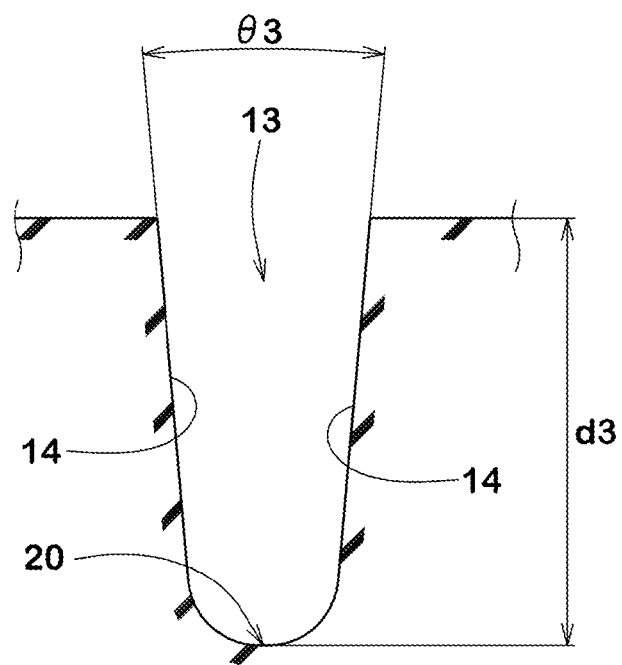
FIG. 3 is a cross-sectional view taken along B-B line of FIG. 1.

FIG. 3 is a cross-sectional view of the third main groove 13 taken along B-B line of FIG. 1. As shown in FIG. 3, a groove depth (d3) of the third main groove 13 is preferably in a range of from 4.0 to 7.0 mm, more preferably in a range of from 5.0 to 6.5 mm, for example.

In the transverse cross-sectional view of the tire, the third main groove 13 has a pair of groove walls 14 extending from a groove bottom portion 20 straight and outwardly in a tire radial direction, for example. It is preferred that an angle θ3 between the pair of the groove walls 14 of the third main groove 13 is not more than the angle θ1 (shown in FIG. 2) of the first main groove 11 and the angle θ2 (shown in FIG. 2) of the second main groove 12. The third main groove 13 configured as such moderates the rigidity of the outer tread portion 6, therefore, it is possible that excellent warming performance is exerted.

Specifically, the angle θ3 of the third main groove 13 is preferably not less than 0 degrees, more preferably not less than 5 degrees, and preferably not more than 45 degrees, more preferably not more than 30 degrees, further preferably not more than 15 degrees.

As shown in FIG. 1, the land regions 15 include an inner middle land region 16, an outer middle land region 17, an inner shoulder land region 18, and an outer shoulder land region 19. The inner middle land region 16 is defined as a region between the first main groove 11 and the second main groove 12. The outer middle land region 17 is defined as a region between the first main groove 11 and the third main groove 13. The inner shoulder land region 18 is defined as a region between the second main groove 12 and the inner tread edge (Ti). The outer shoulder land region 19 is defined as a region between the third main groove 13 and the outer tread edge (To).

The outer middle land region 17 has a width W5 in the tire axial direction larger than that of the inner middle land region 16. Thereby, the width W5 of the outer middle land region 17 to which large ground contact pressure is applied during cornering is secured, therefore, it is possible that excellent dry grip performance and the uneven wear resistance performance are exerted.

In order to further exert the above effect, it is preferred that the width W5 of the outer middle land region 17 is in a range of from 1.3 to 2.5 times a width W4 in the tire axial direction of the inner middle land region 16.

From a similar point of view, it is preferred that the outer shoulder land region 19 has a width W7 in the tire axial direction larger than that of the inner shoulder land region 18, for example. Specifically, it is preferred that the width W7 of the outer shoulder land region 19 is in a range of from 1.2 to 2.0 times a width W6 in the tire axial direction of the inner shoulder land region 18.

Each of the land regions 15 in this embodiment is configured as a plane rib having no grooves. Each of the land regions 15 configured as such can exert excellent dry grip performance during running in severe condition on a circuit and the like.

Figure 4A:
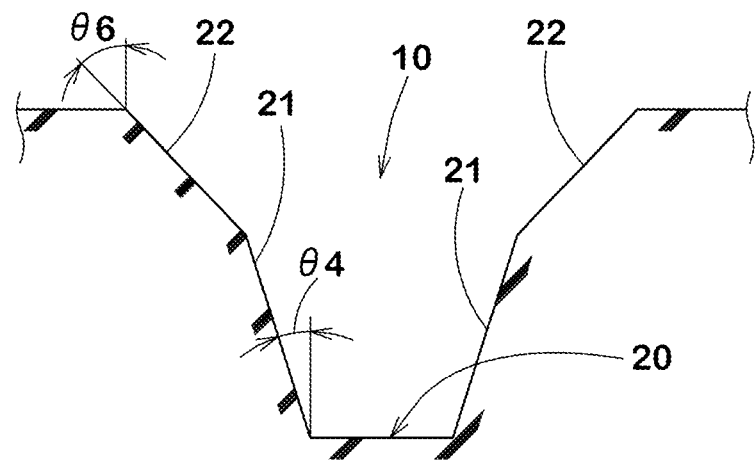
FIG. 4A is a transverse cross-sectional view showing another embodiment of main groove.
Figure 4B:
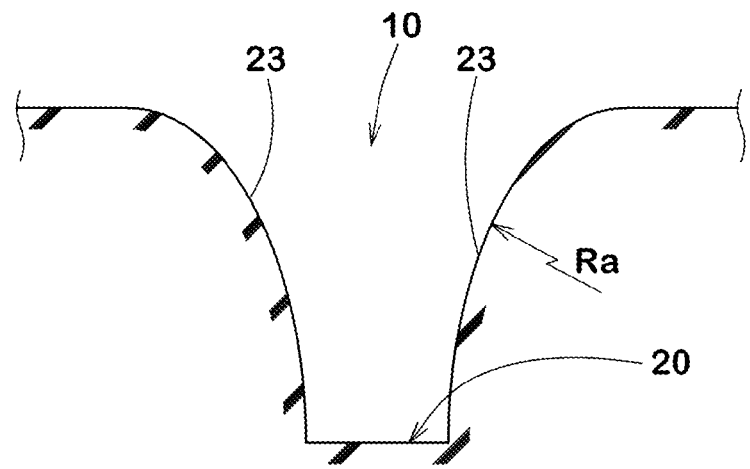
FIG. 4B is a transverse cross-sectional view showing another embodiment of main groove.
Figure 4C:
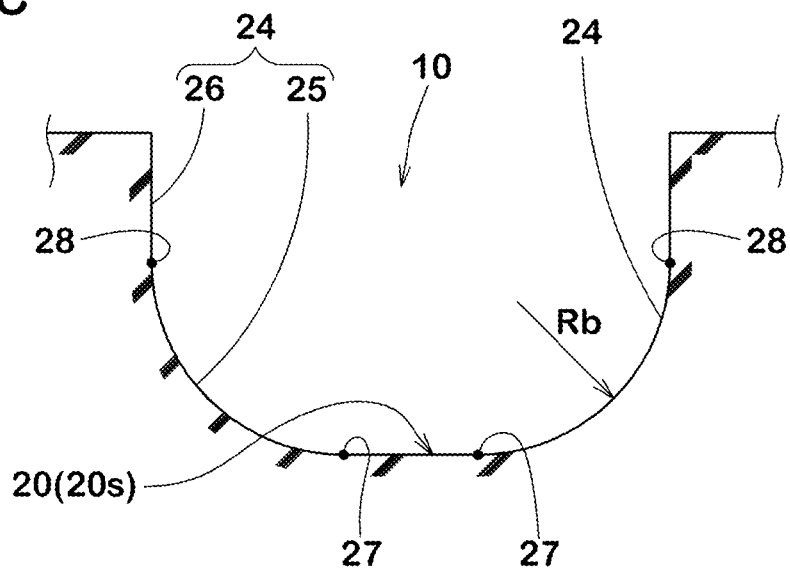
FIG. 4C is a transverse cross-sectional view showing another embodiment of main groove.

FIGS. 4A, 4B, and 4C are transverse cross-sectional views showing other embodiments of the main grooves 10 described above. In these embodiments, the groove widths and the groove depths of the main grooves 10 can be in the same ranges as the above-mentioned ranges.

The main groove 10 shown in FIG. 4A includes, for example, a pair of first groove walls 21 extending straight and radially outwardly from the groove bottom portion 20 and a pair of second groove walls 22 extending straight at a different inclination angle from that of the first groove walls.

Each of the first groove walls 21 is inclined at an angle θ4 in a range of from 10 to 20 degrees with respect to the tire radial direction, for example. Thereby, an angle θ5 (not shown) between the pair of the first groove walls 21 is in a range of from 20 to 40 degrees, for example.

Each of the second groove walls 22 is inclined at an angle θ6 larger than those of the first groove walls 21 with respect to the tire radial direction, for example. The angles θ6 of the second groove walls 22 are in a range of from 40 to 50 degrees, for example. Thereby, an angle θ7 (not shown) between the pair of the second groove walls 22 is in a range of from 80 to 100 degrees, for example.

With the main groove 10 shown in FIG. 4A, it is possible that opening area (groove area) on a ground contacting surface of the tire is increased, therefore, it is possible that the aquaplaning phenomenon is suppressed. Further, the main groove 10 configured as such also helps to suppress the uneven wear starting from the groove edges.

The main groove 10 shown in FIG. 4B has groove walls 23 each curved in a smooth convex shape. In a preferred embodiment, a radius of curvature (Ra) of each of the groove walls 23 decreases radially outwardly. Thereby, a distance between the pair of the groove walls 23 gradually increases radially outwardly, and in particular, it increases sharply near the groove edges. The main groove 10 configured as such can further suppress the uneven wear of the groove edges. Further, the land regions 15 divided by the main grooves 10 configured as such are likely to deform in entirety thereof when stress in the tire axial direction is applied, therefore, it is possible that occurrence of cracks is effectively suppressed.

The main groove 10 shown in FIG. 4C has groove walls 24 each curved in a smooth concave shape. More specifically, each of the groove walls 24 in this embodiment includes a circular arc portion 25 recessed in a smooth circular arc shape and a straight portion 26 extending straight from a radially outer edge of the circular arc portion 25. Each of the circular arc portion 25 is formed between one of ends 27 of a bottom surface (20s) extending along the tire axial direction of the groove bottom portion 20 and a radially inner end 28 of one of the straight portions 26 adjacent thereto. A radius of curvature of each of the circular arc portions 25 is set to be in about a range of from 0.5 to 1.0 times the groove depths of the main grooves 10, which is larger than a radius of curvature of the conventional groove. The main grooves 10 configured as such increase the rigidity in the tire axial direction of each of the land regions by the circular arc portions 25, therefore, it is possible that excellent dry grip performance is exerted. Further, the main grooves 10 configured as such can also increase frictional force in the tire axial direction during running on a wet road surface by edge effect of the groove edges thereof.

Figure 5:
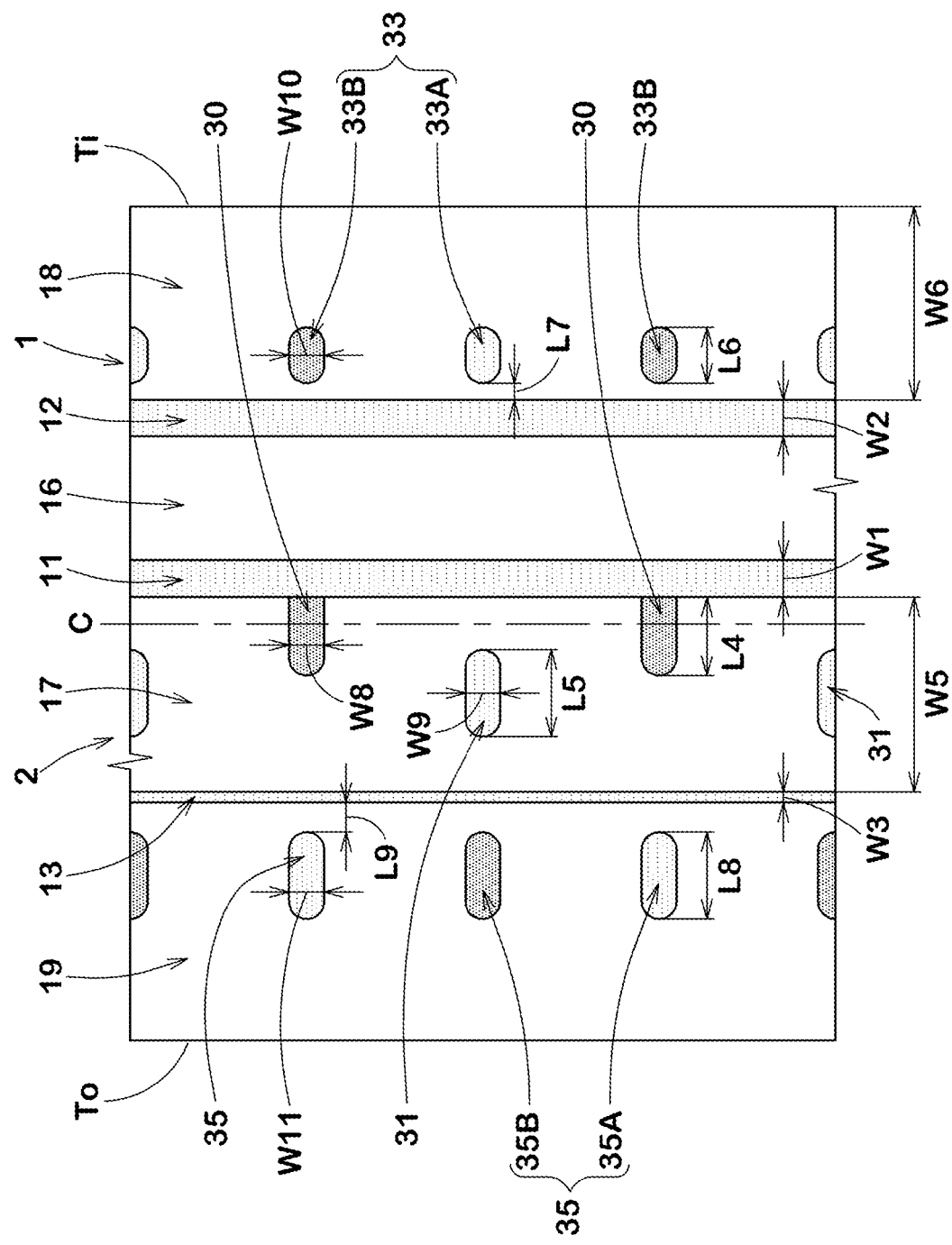
FIG. 5 is a development view of a tread portion of a tire according to another embodiment of the present invention.

FIG. 5 is a development view of the tread portion 2 of the tire 1 according to another embodiment of the present invention. In FIG. 5, same reference numerals are used for elements common to the embodiments described above, and the explanation thereof is omitted here.

In this embodiment, the inner middle land region 16 is configured as a plain rib not provided with grooves, and other land regions are provided with grooves. The inner middle land region 16 is configured to have a relatively small width, therefore, it is possible that the progress of wear of the tread portion 2 is made uniform since the inner middle land region 16 is configured as a plain rib.

The outer middle land region 17 is provided with a plurality of outer middle lateral grooves 30 and a plurality of outer middle grooves 31. The outer middle lateral grooves 30 and the outer middle grooves 31 in this embodiment are arranged alternately in the tire circumferential direction.

Each of the outer middle lateral grooves 30 extends from the first main groove 11 toward the outer tread edge (To) and terminates within the outer middle land region 17, for example. Each of the outer middle lateral grooves 30 in this embodiment is arranged so as to cross the tire equator (C). The outer middle lateral grooves 30 configured as such, together with the first main groove 11, can effectively improve the wet performance.

It is preferred that each of the outer middle lateral grooves 30 is arranged at an angle not more than 15 degrees with respect to the tire axial direction, for example, and, in this embodiment, extends along the tire axial direction.

It is preferred that each of the outer middle lateral grooves 30 have a length L4 in the tire axial direction in a range of from 0.35 to 0.45 times the width W5 in the tire axial direction of the outer middle land region 17. The outer middle lateral grooves 30 configured as such can exert excellent dry grip performance and the warming performance.

In order to further exert the effect described above, it is preferred that each of the outer middle lateral grooves 30 has a groove width W8 in a range of from 0.90 to 1.10 times the groove width W1 of the first main groove 11, for example. It is preferred that each of the outer middle lateral grooves 30 has a depth in a range of from 0.25 to 0.40 times the depth of the first main groove 11, for example.

Each of the outer middle grooves 31 has a loop-like edge, and a region surrounded by the edge is recessed. Each of the outer middle grooves 31 in this embodiment is formed in an elliptic oval shape elongated in the tire axial direction, for example. Both ends in the tire axial direction of each of the outer middle grooves 31 do not reach the first main groove 11 and the second main groove 12, i.e. both ends of the outer middle grooves 31 are not connected with the first main groove 11 and the second main groove 12. The outer middle grooves 31 configured as such can improve the wet performance while suppressing decrease in the rigidity of the outer middle land region 17. However, the present invention is not limited to such an embodiment, and the outer middle grooves 31 may be, for example, vertically elongated, and can have various shapes such as a circular shape, an elliptic shape, a rectangular shape, and the like.

It is preferred that each of the outer middle grooves 31 is arranged at an angle θ8 (not shown) not more than 15 degrees with respect to the tire axial direction, for example. In a more preferred embodiment, the outer middle grooves 31 extend along the tire axial direction. The outer middle grooves 31 configured as such can improve the wet performance while maintaining the rigidity in the tire axial direction of the outer middle land region 17.

It is preferred that the outer middle grooves 31 overlap with the outer middle lateral grooves 30 in the tire axial direction, for example. In other words, ends on a side of the inner tread edge (Ti) of the outer middle grooves 31 are located on the side of the inner tread edge (Ti) with respect to ends on a side of the outer tread edge (To) of the outer middle lateral grooves 30. Such an arrangement of the outer middle grooves 31 are helpful for the outer middle land region 17 in moderately deforming, therefore, it is possible that the warming performance and the control performance of a vehicle are improved.

In order to exert the effects described above while maintaining the dry grip performance, it is preferred that each of the outer middle grooves 31 has a length L5 in the tire axial direction in a range of from 0.40 to 0.50 times the width W5 in the tire axial direction of the outer middle land region 17, for example. From a similar point of view, it is preferred that each of the outer middle grooves 31 has a width W9 in a range of from 0.90 to 1.10 times the groove width W1 of the first main groove 11, for example.

It is preferred that the outer middle grooves 31 have greater depths than those of the outer middle lateral grooves 30, for example. It is preferred that each of the outer middle grooves 31 in this embodiment has a depth in a range of from 2.5 to 3.5 times a depth of each of the outer middle lateral grooves 30, for example. Thereby, the wet performance and the warming performance are further improved.

It is preferred that the inner shoulder land region 18 is provided with a plurality of inner shoulder grooves 33, for example. Each of the inner shoulder grooves 33 has a loop-like edge, and a region surrounded by the edge is recessed. Each of the inner shoulder grooves 33 in this embodiment are formed in an elliptic oval shape elongated in the tire axial direction, for example. Both ends in the tire axial direction of each of the inner shoulder grooves 33 do not reach the second main groove 12 and the inner tread edge (Ti), i.e. both ends of the inner shoulder grooves 33 are not connected with the second main groove 12 and the inner tread edge (Ti). The inner shoulder grooves 33 configured as such can improve traction performance during running on a wet road surface by the edge effects while suppressing excessive decrease in the rigidity of the inner shoulder land region 18. The inner shoulder grooves 33 are not limited to such a configuration, and they may be configured as a vertically elongated shape, and can have various shapes such as a circular shape, an elliptical shape, a rectangular shape, and the like, for example.

It is preferred that each of the inner shoulder grooves 33 has a length L6 in the tire axial direction in a range of from 0.20 to 0.35 times the width W6 in the tire axial direction of the inner shoulder land region 18, for example.

It is preferred that a distance L7 between the groove edge of the second main groove 12 and the edge of each of the inner shoulder grooves 33 is smaller than the groove width W2 of the second main groove 12, for example. It is more preferred that the distance L7 is in a range of from 0.35 to 0.45 times the groove width W2 of the second main groove 12. The inner shoulder grooves 33 configured as such can further improve the warming performance.

It is preferred that each of the inner shoulder grooves 33 has a width W10 in a range of from 0.90 to 1.10 times the groove width W2 of the second main groove 12, for example. The inner shoulder grooves 33 configured as such can improve the wet performance while suppressing the uneven wear of the inner shoulder land region 18.

It is preferred that the inner shoulder grooves 33 include first inner shoulder grooves 33A and second inner shoulder grooves 33B having different depths from those of the first inner shoulder grooves 33A, for example. The first inner shoulder grooves 33A and the second inner shoulder grooves 33B in this embodiment are arranged alternately in the tire circumferential direction.

Each of the first inner shoulder grooves 33A has a depth in a range of from 0.90 to 1.10 times the groove depth of the second main groove 12, for example. The second inner shoulder grooves 33B have smaller depths than those of the first inner shoulder grooves 33A, for example. Each of the second inner shoulder grooves 33B in this embodiment has a depth in a range of from 0.25 to 0.40 times the depth of each of the first inner shoulder grooves 33A, for example. The first inner shoulder grooves 33A and the second inner shoulder grooves 33B configured as such can improve the warming performance while maintaining the dry grip performance.

It is preferred that the outer shoulder land region 19 is provided with a plurality of outer shoulder grooves 35. Each of the outer shoulder grooves 35 has a loop-like edge, and a region surrounded by the edge is recessed. Each of the outer shoulder grooves 35 in this embodiment is formed in an elliptic oval shape elongated in the tire axial direction, for example. Both ends in the tire axial direction of each of the outer shoulder grooves 35 do not reach the third main groove 13 and the outer tread edge (To), i.e. both ends of the outer shoulder grooves 35 are not connected with the third main groove 13 and the outer tread edge (To). The outer shoulder grooves 35 configured as such can improve the traction performance during running on a wet road surface by the edge effects while suppressing excessive decrease in the rigidity of the outer shoulder land region 19. The outer shoulder grooves 35 are not limited to such a configuration, and they may be configured as a vertically elongated shape, and can have various shapes such as a circular shape, an elliptical shape, a rectangular shape, and the like, for example.

It is preferred that each of the outer shoulder grooves 35 is arranged at an angle θ9 (not shown) not more than 15 degrees with respect to the tire axial direction, for example. In a more preferred embodiment, the outer shoulder grooves 35 extend along the tire axial direction. The outer shoulder grooves 35 configured as such can improve the wet performance while maintaining the rigidity in the tire axial direction of the outer shoulder land region 19.

It is preferred that each of the outer shoulder grooves 35 has a length L8 in the tire axial direction larger than that of each of the inner shoulder grooves 33. In a preferred embodiment, it is preferred that each of the outer shoulder grooves 35 has the length L8 in a range of from 1.5 to 2.0 times that of each of the inner shoulder grooves 33. Thereby, further excellent warming performance can be obtained.

It is preferred that a distance L9 between the groove edge of the third main groove 13 and the edge of each of the outer shoulder grooves 35 is larger than the groove width W3 of the third main groove 13, for example. It is further preferred that the distance L9 is in a range of from 2.5 to 3.5 times the groove width W3 of the third main groove 13. In this embodiment, the angle of the groove walls of the third main groove 13 is relatively small, therefore, excellent wet performance and the uneven wear resistance performance can be obtained by appropriately separating the outer shoulder grooves 35 from the third main groove 13.

It is preferred that each of the outer shoulder grooves 35 has a width W11 in a range of from 0.90 to 1.10 times the width W9 of each of the outer middle grooves 31, for example. The widths W11 of the outer shoulder grooves 35 in this embodiment are the same as the widths W9 of the outer middle grooves 31. Thereby, it is possible that the progress of wear of the outer middle land region 17 and the outer shoulder land region 19 is made close to uniform.

It is preferred that the outer shoulder grooves 35 include first outer shoulder grooves 35A and second outer shoulder grooves 35B having different depths from those of the first outer shoulder grooves 35A, for example. The first outer shoulder grooves 35A and the second outer shoulder grooves 35B in this embodiment are arranged alternately in the tire circumferential direction.

Each of the first outer shoulder grooves 35A has a depth in a range of from 0.90 to 1.10 times the groove depth of the third main groove 13, for example. The second outer shoulder grooves 35B have smaller depths than those of the first outer shoulder grooves 35A, for example. Each of the second outer shoulder grooves 35B in this embodiment has the depth in a range of from 0.25 to 0.40 times that of each of the first outer shoulder grooves 35A, for example. The first outer shoulder grooves 35A and the second outer shoulder grooves 35B configured as such can improve the warming performance while maintaining the dry grip performance.

While detailed description has been made of the tire as an embodiment of the present invention, the present invention can be embodied in various forms without being limited to the illustrated embodiment.

WORKING EXAMPLE (EXAMPLE)

Figure 6:
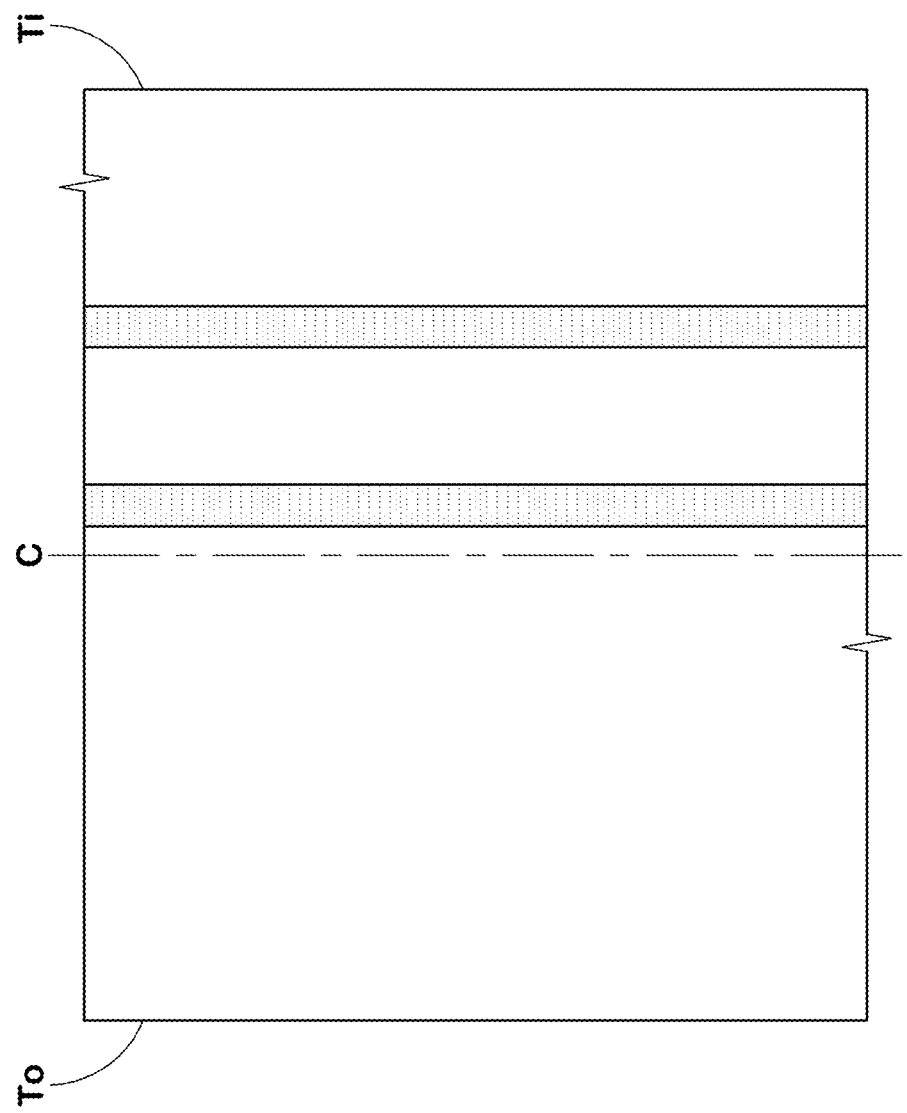
FIG. 6 is a development view of a tread portion of a tire as a reference.

Tires of size 235/40R18 having the basic tread pattern shown in FIG. 1 were made by way of test according to the specifications listed in Table 1. As a reference, as shown in FIG. 6, a tire provided with only the first main groove and the second main groove and not provided with the third main groove was made by way of test. Each of the test tires was tested for running time on a dry road surface, speed at the time of occurrence of aquaplaning phenomenon, and the uneven wear resistance performance. Common specifications and the test methods of each of the test tires are as follows.
Tire rim: 18×8.5 J
Tire pressure: 180 kPa
Test vehicle: 4WD-car with displacement of 2500 cc
Inner tread width (Wi): 105.0 mm
Outer tread width (Wo): 105.0 mm
Groove width W1 of First main groove and Groove width W2 of Second main groove: 10.0 mm
Groove depth of each of Main grooves: 6.0 mm Running Time on Dry Road Surface By using the above test vehicle with the above test tires mounted on, the running time when the test vehicle run a 5-kilometer turn of a dry paved circuit track was measured. The results are indicated by an index based on the reference being 100, wherein the smaller the numerical value, the shorter the running time is.

Speed at the Time of Occurrence of Aquaplaning Phenomenon

By using an inside drum test machine, each of the test tires was run on a drum surface covered by 5.0 mm depth of water under the conditions shown below and speed when aquaplaning phenomenon occurred was measured. The test results are indicated by an index based on the reference being 100, wherein the larger the numerical value, the higher the speed at the time of occurrence of aquaplaning phenomenon, which means the better wet performance.
Slip angle: 1.0 degree
Longitudinal load: 3.92 kN
Tire pressure: 250 kPa Uneven Wear Resistance Performance After running continuously for 20 km on the above circuit track, difference between wear amount of the inner middle land region and wear amount of the outer middle land region was measured. The test results are indicated by an index based on the wear amount difference of the reference being 100, wherein the smaller the numerical value, the more uniform the wear amount of the inner middle land region and the outer middle land region, which means the better uneven wear resistance performance.

The test results are shown in Table 1.

TABLE 1

| | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Figure showing tread pattern | FIG. 6 | FIG. 1 | FIG. 1 | FIG. 1 | FIG. 1 | FIG. 1 | FIG. 1 | FIG. 1 | FIG. 1 |
| Distance L1 of First main groove/Inner tread width (Wi) [%] | 12 | 12 | 19 | 10 | 19 | 5 | 8 | 10 | 20 |
| Angle θ1 between Groove walls of First main groove [degree] | 60 | 60 | 60 | 60 | 60 | 60 | 60 | 60 | 60 |
| Distance L2 of Second main groove/Inner tread width (Wi) [%] | 55 | 55 | 71 | 43 | 52 | 55 | 55 | 55 | 55 |
| Angle θ2 between Groove walls of Second main groove [degree] | 60 | 60 | 60 | 60 | 60 | 60 | 60 | 60 | 60 |
| Distance L3 of Third main groove/Outer tread width (Wo) [%] | — | 48 | 48 | 29 | 48 | 48 | 48 | 48 | 48 |
| Groove width W3 of Third main groove/Groove width W1 of First main groove | — | 0.30 | 0.30 | 0.30 | 0.30 | 0.30 | 0.30 | 0.30 | 0.30 |
| Angle θ3 between Groove walls of Third main groove [degree] | — | 10 | 10 | 10 | 10 | 10 | 10 | 10 | 10 |
| Width W5 of Outer middle land region/Width W4 of Inner middle land region | — | 1.61 | 1.43 | 1.35 | 2.59 | 1.16 | 1.33 | 1.46 | 2.42 |
| Running time on a dry road surface [index] | 100 | 94 | 98 | 98 | 97 | 98 | 95 | 94 | 97 |
| Speed at the time of occurrence of Aquaplaning phenomenon [index] | 100 | 106 | 103 | 106 | 105 | 107 | 106 | 106 | 105 |
| Uneven wear resistance performance [index] | 100 | 103 | 102 | 102 | 102 | 99 | 99 | 100 | 101 |

| | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Figure showing tread pattern | FIG. 1 | FIG. 1 | FIG. 1 | FIG. 1 | FIG. 1 | FIG. 1 | FIG. 1 | FIG. 1 | FIG. 1 |
| Distance L1 of First main groove/Inner tread width (Wi) [%] | 25 | 12 | 12 | 12 | 12 | 12 | 12 | 12 | 12 |
| Angle θ1 between Groove walls of First main groove [degree] | 60 | 60 | 60 | 60 | 60 | 60 | 60 | 60 | 60 |

TABLE 1-continued

|  | | | | | | | | | |
|---|---|---|---|---|---|---|---|---|---|
| Distance L2 of Second main groove/Inner tread width (Wi) [%] | 55 | 35 | 40 | 60 | 65 | 55 | 55 | 55 | 55 |
| Angle θ2 between Groove walls of Second main groove [degree] | 60 | 60 | 60 | 60 | 60 | 60 | 60 | 60 | 60 |
| Distance L3 of Third main groove/Outer tread width (Wo) [%] | 48 | 48 | 48 | 48 | 48 | 30 | 35 | 50 | 55 |
| Groove width W3 of Third main groove/Groove width W1 of First main groove | 0.30 | 0.30 | 0.30 | 0.30 | 0.30 | 0.30 | 0.30 | 0.30 | 0.30 |
| Angle θ3 between Groove walls of Third main groove [degree] | 10 | 10 | 10 | 10 | 10 | 10 | 10 | 10 | 10 |
| Width W5 of Outer middle land region/Width W4 of Inner middle land region | 3.26 | 3.99 | 2.91 | 1.40 | 1.24 | 1.07 | 1.22 | 1.67 | 1.81 |
| Running time on a dry road surface [index] | 97 | 97 | 94 | 94 | 95 | 98 | 96 | 94 | 96 |
| Speed at the time of occurrence of Aquaplaning phenomenon [index] | 105 | 106 | 106 | 106 | 104 | 106 | 106 | 106 | 104 |
| Uneven wear resistance performance [index] | 104 | 102 | 103 | 103 | 102 | 102 | 102 | 102 | 103 |

|  | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Figure showing tread pattern | FIG. 1 | FIG. 1 | FIG. 1 | FIG. 1 | FIG. 1 | FIG. 1 | FIG. 1 | FIG. 1 | FIG. 1 |
| Distance L1 of First main groove/Inner tread width (Wi) [%] | 12 | 12 | 12 | 12 | 12 | 12 | 12 | 12 | 12 |
| Angle θ1 between Groove walls of First main groove [degree] | 60 | 60 | 45 | 55 | 65 | 75 | 60 | 60 | 60 |
| Distance L2 of Second main groove/Inner tread width (Wi) [%] | 55 | 55 | 55 | 55 | 55 | 55 | 55 | 55 | 55 |
| Angle θ2 between Groove walls of Second main groove [degree] | 60 | 60 | 45 | 55 | 65 | 75 | 60 | 60 | 60 |
| Distance L3 of Third main groove/Outer tread width (Wo) [%] | 48 | 48 | 48 | 48 | 48 | 48 | 48 | 48 | 48 |
| Groove width W3 of Third main groove/Groove width W1 of First main groove | 0.20 | 0.40 | 0.30 | 0.30 | 0.30 | 0.30 | 0.30 | 0.30 | 0.30 |
| Angle θ3 between Groove walls of Third main groove [degree] | 10 | 10 | 10 | 10 | 10 | 10 | 60 | 5 | 45 |
| Width W5 of Outer middle land region/Width W4 of Inner middle land region | 1.61 | 1.61 | 1.61 | 1.61 | 1.61 | 1.61 | 1.61 | 1.61 | 1.61 |
| Running time on a dry road surface [index] | 93 | 96 | 94 | 94 | 95 | 97 | 96 | 95 | 94 |
| Speed at the time of occurrence of Aquaplaning phenomenon [index] | 103 | 107 | 103 | 105 | 107 | 107 | 103 | 106 | 104 |
| Uneven wear resistance performance [index] | 103 | 102 | 101 | 103 | 103 | 102 | 102 | 101 | 101 |

From the test results, it was confirmed that the tires as the example exerted excellent wet performance while maintaining the dry grip performance and the uneven wear resistance performance.

The invention claimed is:

1. A tire comprising:
   a tread portion, whose position when mounted on a vehicle is specified, comprising an outer tread edge positioned on an outer side of the vehicle when mounted on the vehicle, an inner tread edge positioned on an inner side of the vehicle when mounted on the vehicle, a plurality of main grooves extending continuously in a tire circumferential direction, and a plurality of land regions divided by the main grooves, wherein the main grooves include
      a first main groove whose groove edges are both positioned on a side closer to the inner tread edge of a tire equator,
      a second main groove arranged between the first main groove and the inner tread edge, and
      a third main groove whose groove edges are both positioned between the tire equator and the outer tread edge and having a width smaller than those of the first main groove and the second main groove,
   the land regions include
      an inner middle land region defined as a region between the first main groove and the second main groove,
      an inner shoulder land region defined as a region between the second main groove and the inner tread edge,
      an outer middle land region defined as a region between the first main groove and the third main groove and having a width in a tire axial direction larger than that of the inner middle land region, and
      an outer shoulder land region defined as a region between the third main groove and the outer tread edge, a distance L1 in the tire axial direction between the tire equator and a center line of the first main groove is in a range of from 8% to 25% of an inner tread width (Wi) between the tire equator and the inner tread edge, a distance L2 in the tire axial direction between the tire equator and a center line of the second main groove is in a range of from 40% to 60% of the inner tread width (Wi), a distance L3 in the tire axial direction between the tire equator and a center line of the third main groove is in a range of from 35% to 50% of an outer tread width (Wo) between the tire equator and the outer tread edge, the inner shoulder land region is provided with a plurality of inner shoulder grooves which have both ends in the tire axial direction not connected with the main grooves and the inner tread edge, the plurality of inner shoulder grooves extends in parallel with the tire axial direction, the plurality of inner shoulder grooves has a width in a range of 0.90 to 1.10 times a groove width of the second main groove, the plurality of inner shoulder grooves has a depth in a range of 0.90 to 1.10 times a groove depth of the second main groove, the plurality of inner shoulder grooves is offset axially inwardly from an axial center location of the inner shoulder land region so that an axial outer-half region of the inner shoulder land region forms a plain pattern being not provided with any grooves over an entire region in the tire circumferential direction, the outer shoulder land region is provided with a plurality of outer shoulder grooves wherein both ends thereof in the tire axial direction are not connected with the main grooves and the outer tread edge, and the plurality of outer shoulder grooves is offset axially inwardly from an axial center location of the outer shoulder land region so that a plain region having no grooves over its entirety in the tire circumferential direction is formed between axially outer ends of the plurality of outer shoulder grooves and the outer tread edge, wherein the plain region of the outer shoulder land region extends to an axial half width of the outer shoulder land region.

2. The tire according to claim 1, wherein in a transverse cross-sectional view of the tire, each of the main grooves has a pair of groove walls extending straight and outwardly in a tire radial direction, an angle θ1 between the pair of the groove walls of the first main groove and an angle θ2 between the pair of the groove walls of the second main groove is in a range of from 45 to 75 degrees, and an angle θ3 between the pair of the groove walls of the third main groove is in a range of from 0 to 30 degrees.

3. The tire according to claim 1, wherein the inner middle land region is configured as a plain rib having no grooves.

4. The tire according to claim 1, wherein both of the groove edges of the third main groove extend continuously in the tire circumferential direction without being connected with other grooves.

5. The tire according to claim 1, wherein the outer middle land region is provided with a plurality of outer middle lateral grooves extending from the first main groove toward the outer tread edge and terminating within the outer middle land region.

6. The tire according to claim 1 wherein the inner shoulder grooves include first inner shoulder grooves and second inner shoulder grooves having depths smaller than those of the first inner shoulder grooves, and the first inner shoulder grooves and the second inner shoulder grooves are arranged alternately in the tire circumferential direction.

7. The tire according to claim 1, wherein the land regions further include an outer shoulder land region defined as a region between the third main groove and the outer tread edge, the outer shoulder land region is provided with a plurality of outer shoulder grooves whose both ends in the tire axial direction are not connected with the main grooves and the outer tread edge, and the plurality of outer shoulder grooves has a length L8 in the tire axial direction larger than that of each of the plurality of inner shoulder grooves.

8. The tire according to claim 7, wherein the outer shoulder grooves include first outer shoulder grooves and second outer shoulder grooves having depths smaller than those of the first outer shoulder grooves, and the first outer shoulder grooves and the second outer shoulder grooves are arranged alternately in the tire circumferential direction.

9. The tire according to claim 1, wherein a width W5 in the tire axial direction of the outer middle land region is in a range of from 1.3 to 2.5 times a width W4 in the tire axial direction of the inner middle land region.

10. The tire according to claim 1, wherein a groove width W1 of the first main groove and a groove width W2 of the second main groove 12 are in a range of from 5.0 to 15.0 mm, and a groove width W3 of the third main groove is in a range of from 0.20 to 0.40 times the groove width W1 of the first main groove.

11. The tire according to claim 5, wherein the outer middle land region is further provided with a plurality of outer middle grooves, both ends of the plurality of outer middle grooves are not connected with the first main groove and the third main groove, and the plurality of outer middle lateral grooves and the plurality of outer middle grooves are arranged alternately in the tire circumferential direction.

12. The tire according to claim 11, wherein the plurality of outer middle lateral grooves and the plurality of outer middle grooves are overlapped with one another in the tire axial direction.

13. The tire according to claim 7, wherein the plurality of outer shoulder grooves has a length L8 in the tire axial direction in a range of from 1.5 to 2.0 times that of the plurality of inner shoulder grooves.

14. The tire according to claim 1, wherein the land regions further include an inner shoulder land region defined as a region between the second main groove and the inner tread edge, and the inner shoulder land region has a width in the tire axial direction larger than that of inner middle land region.

15. The tire according to claim 3, wherein the land regions further include an outer shoulder land region defined as a region between the third main groove and the outer tread edge, the outer shoulder land region is provided with a plurality of outer shoulder grooves whose both ends in the tire axial direction are not connected with the main grooves and the outer tread edge, the plurality of outer shoulder grooves is offset axially inwardly from an axial center location of the outer shoulder land region so that a plain region being not provided with any grooves over an entire region in the tire circumferential direction is formed between axially outer ends of the plurality of outer shoulder grooves and the outer tread edge.

16. The tire according to claim 15, wherein the outer middle land region is provided with a plurality of outer middle lateral grooves extending from the first main groove toward the outer tread edge and terminating within the outer middle land region.

17. The tire according to claim 1, wherein the inner shoulder grooves include first inner shoulder grooves and second inner shoulder grooves having depths smaller than those of the first inner shoulder grooves, the first inner shoulder grooves and the second inner shoulder grooves are arranged alternately in the tire circumferential direction, the land regions further include an outer shoulder land region defined as a region between the third main groove and the outer tread edge, the outer shoulder land region is provided with a plurality of outer shoulder grooves whose both ends in the tire axial direction are not connected with the main grooves and the outer tread edge, the outer shoulder grooves include first outer shoulder grooves and second outer shoulder grooves having depths smaller than those of the first outer shoulder grooves, the first outer shoulder grooves and the second outer shoulder grooves are arranged alternately in the tire circumferential direction, the first inner shoulder grooves are arranged at the same locations in the tire circumferential direction relative to the respective second outer shoulder grooves, and the second inner shoulder grooves are arranged at the same locations in the tire circumferential direction relative to the respective first outer shoulder grooves.

18. The tire according to claim 1, wherein the inner shoulder grooves include first inner shoulder grooves and second inner shoulder grooves having depths smaller than those of the first inner shoulder grooves, the first inner shoulder grooves and the second inner shoulder grooves are arranged alternately in the tire circumferential direction, the land regions further include an outer shoulder land region defined as a region between the third main groove and the outer tread edge, the outer shoulder land region is provided with a plurality of outer shoulder grooves whose both ends in the tire axial direction are not connected with the main grooves and the outer tread edge, the outer shoulder grooves include first outer shoulder grooves and second outer shoulder grooves having depths smaller than those of the first outer shoulder grooves, the first outer shoulder grooves and the second outer shoulder grooves are arranged alternately in the tire circumferential direction, the first inner shoulder grooves are arranged at the same locations in the tire circumferential direction relative to the respective second outer shoulder grooves, the second inner shoulder grooves are arranged at the same locations in the tire circumferential direction relative to the respective first outer shoulder grooves, the first inner shoulder grooves, the second inner shoulder grooves, first outer shoulder grooves, and the second outer shoulder grooves extend in parallel with the tire axial direction, the first inner shoulder grooves have a depth in a range of 0.90 to 1.10 times a groove depth of the second main groove, and the second inner shoulder grooves have a depth in a range of 0.25 to 0.40 times the depth of the first inner shoulder grooves.

* * * * *